Jan. 7, 1958 E. W. HUBER 2,819,195
METHODS OF PRODUCING PICK-OFF PRINTED ADHESIVE METAL PLATES
Filed July 6, 1956 2 Sheets-Sheet 1

INVENTOR
Erwin W. Huber

BY
ATTORNEYS

Jan. 7, 1958  E. W. HUBER  2,819,195
METHODS OF PRODUCING PICK-OFF PRINTED ADHESIVE METAL PLATES
Filed July 6, 1956  2 Sheets-Sheet 2
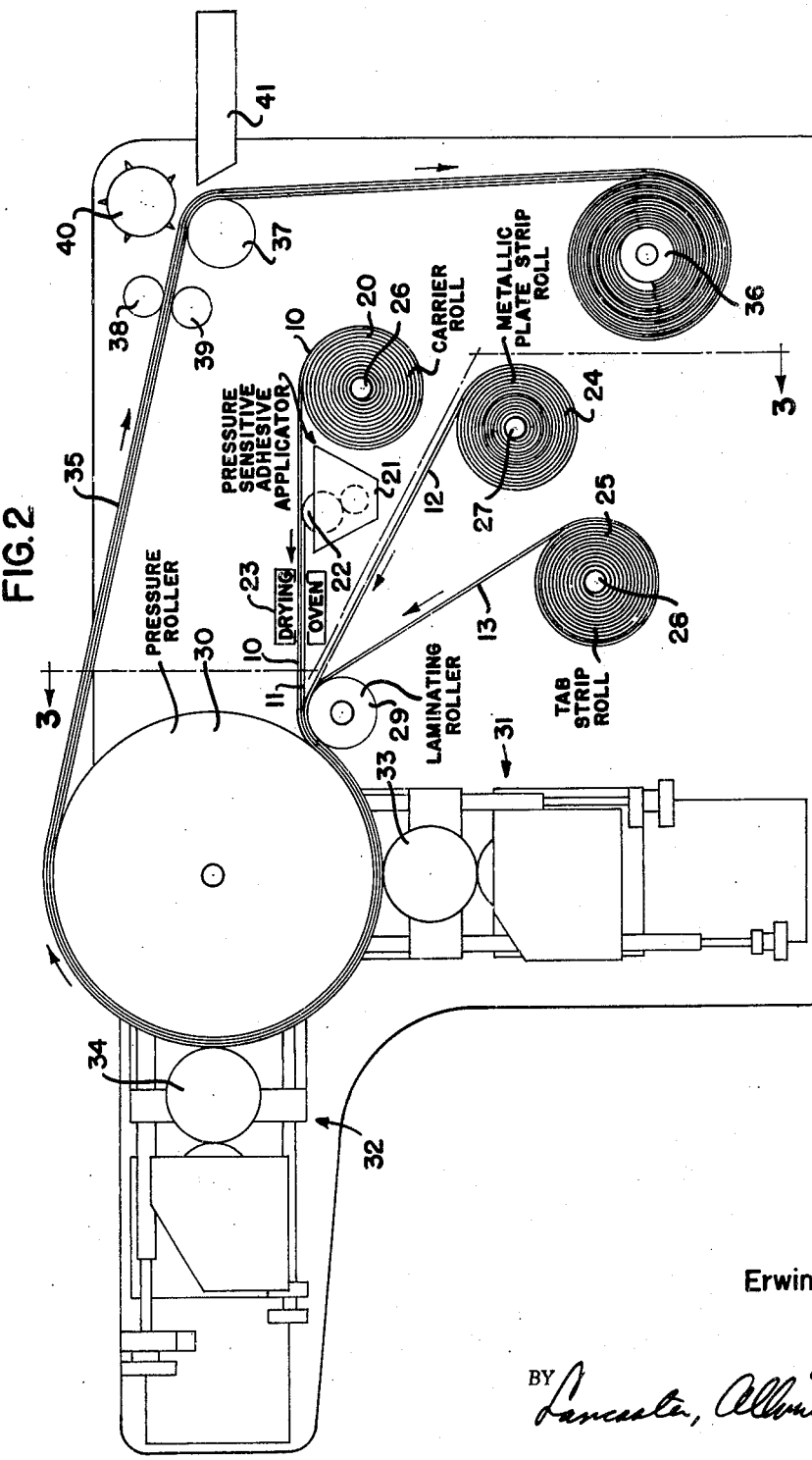
INVENTOR
Erwin W. Huber
BY Lancaster, Allwine Rommel
ATTORNEYS

United States Patent Office 2,819,195
Patented Jan. 7, 1958

2,819,195

METHODS OF PRODUCING PICK-OFF PRINTED ADHESIVE METAL PLATES

Erwin W. Huber, Towson, Md.

Application July 6, 1956, Serial No. 596,258

12 Claims. (Cl. 154—79)

This invention relates to methods of producing pick-off printed adhesive metal plates.

Pick-off printed adhesive metal plates are produced conventionally by laminating a transfer adhesive tape or carrier to a metal plate, then shearing or die cutting around the boundries of the plate so that corresponding edges of the plate and tape are in the same plane. The transfer adhesive tape, comprising a protective backing or carrier, coated with a pressure sensitive adhesive on one face thereof and carrying the metal label, then becomes an article of manufacture and is manipulated by picking at the edges of the backing material, as with the nails of the fingers and thumb, or soaking the article in water, until the plate, with the adhesive adhering to it, comes away from the backing. These are slow and laborious procedures and often result in damage to the plate (such as when of thin metal) or loss of some of the adhesive (which may be accidently removed by a thumb nail) or damage to both.

An important object of the invention is to provide methods for the production of pick-off printed adhesive metal plates (by which term I include labels and the like) which are so processed that the plates carrying the adhesive, may be readily separated from the tape or carrier without the laborious picking or soaking mentioned.

In the manufacture of pick-off adhesive metal plates, in order to render the separation of tape or carrier and plate and adhesive, it is desirable to provide a tab or fingerhold adhering to a portion of the tape or carrier and projecting outwardly from one edge of the plate. Since, in the manufacture of pick-off adhesive metal plates, it would be economical and desirable in processing to provide the plate and tab of the same metallic material, it was conceived to unite the plate and tab, as an integral ribbon or length, with the adhesive-coated tape (as of paper) and then die cut the metal to separate the plate and tab, but it was discovered that this tended to deform or bend downwardly the metal at the cut. Moreover, the impact of the die or cutting blade was transferred almost exactly through the metallic material into the laminate below or behind it, despite the fact that the die or cuting blade itself did not touch the tape or carrier. The deformed metal also often tended to weaken the tape at the cut since the edges of the metal acted somewhat like knives. As a result the tabs and portions of the tape or the carrier beneath often separated or broke away from the rest of the tape or were pulled away when attempts were made to peel off the tape or carrier from the plate in so-called "front stripping." These problems were not encountered in the manufacture of paper labels, with tabs laminated to adhesive-coated tape, where the labels and tabs were initially integral but separated by die cutting, because the dies are rather easily set to cut into almost any thickness of paper and stop at a predetermined descent. Neither is there the objectionable deformation, as in the case of the metallic stock nor the impact characteristic mentioned above.

Another important object is to provide methods for the production of pick-off adhesive metal plates in which the tabs and plates are disposed with an edge of each in facing contiguous relationship upon an adhesive-coated tape or the like, whereby the latter is not weakened and not apt to accidently separate from the rest of the tape.

When attempts are made to substitute, for the paper tape, an extremely tough hard backing or carrier material, which would not be aversely affected by the impact of the dies, the die and set-up costs would render economically prohibitive a process employing such material.

An additional important object is to provide methods for producing pick-off printed adhesive metal plates which are economical and practical to carry out.

Other objects and advantages of the invention will be apparent during the course of the following detailed description of the invention, taken in connection with the accompanying drawings, forming portions of this disclosure, and in which drawings:

Fig. 2 is a schematic showing of apparatus which may be employed in carrying out the method of producing plates.

Figure 1:
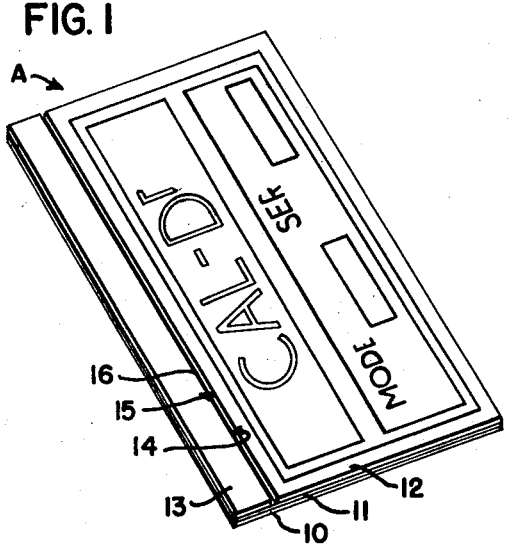
Fig. 1 is a perspective view of an example of a pick-off printed adhesive metal plate produced by the methods herein disclosed.

In the drawings, wherein for the purpose of illustration are shown several embodiments of apparatus and work employed in the methods and wherein similar reference characters designate corresponding parts throughout the several views, the letter A designates an example of the pick-off printed adhesive metal plate which comprises a carrier 10 which may be a portion of backing tape, sheet material or the like, carrying pressure sensitive adhesive 11 upon the upper face thereof and with a plate 12 in contact with a portion of the adhesive 11 and a tab 13 with a longitudinal edge 14 thereof in facing contiguous relationship with a longitudinal edge 15 of the plate 12. In the example shown, there is a space 16 (exaggerated in width in Fig. 1) between the edges 14 and 15.

In removing the carrier 10 and the tab 13 from the adhesive 11 and plate 12, the operator may grasp a portion of the tab and portion of the carrier 10 underlying the grasped portion of the tab and peel the carrier from the adhesive. The operator may then affix the plate to a support by pressing it, with the adhesive 11 between the plate and the support, against the support. The tab and carrier are discarded.

One form of the invention includes the step of providing a carrier, as a tape, provided with a pressure sensitive adhesive coating preferably entirely upon one face thereof. It is preferred that the carrier be very slightly wider than the combined widths of the plate 12 and tab 13. By way of example, with a plate 1½" wide and a tab ¼" wide, the carrier may be 1²⁹⁄₃₀" wide. It may be of paper, cellophane (chemically-treated cellulose in film form) or other hardened plastic films which are flexible. In the case of paper, the same may be impregnated with a suitable resin, such as a phenolic or urea resin in alcoholic solution or allyl alcohol resins, to provide for easy release. The carrier 10 may be in tape form, supplied from a roll 20 conventionally mounted for rotation.

The pressure sensitive adhesive 11 is of the aggressively permanently-setting type, and should have the following characteristics: May be applied to the carrier 10 as by a suitable transfer means as a roller; will adhere firmly to metal as a metal plate; and will adhere to the object to which the plate is applied in a manner that the plate cannot readily be removed. The rubber-resin type pressure sensitive adhesives may be used. It may be supplied from a suitable source, as from a conventional fountain 21 containing an applicator roller 22 adapted to contact one face, as the lower face of the carrier 10 which carrier is fed from the roll 20 preferably disposed adjacent the fountain 21.

In order to drive off surplus solvent (such as alcohol) from the applied pressure sensitive adhesive, I may provide a drying means, such as a conventional drying oven 23 through which the carrier 10 with its adhesive coating 11 travels.

The plate 12 is of metal, such as aluminum, aluminum alloy, copper or copper alloy, such as brass, and is preferably provided from a flexible thin strip which may be wound to provide a roll 24 from which it may be unwound as needed.

The tab 13 may be of the same material as that of the plate but may also be of paper, cloth, cellophane in film form or other hardened but flexible plastic. Preferably, it is of substantially the same thickness as that of the plate 12, so that a stack of plates A will not slant, and the tab may be in the form of a strip which may be wound to form a roll 25 from which it may be unwound as needed.

Figure 3:
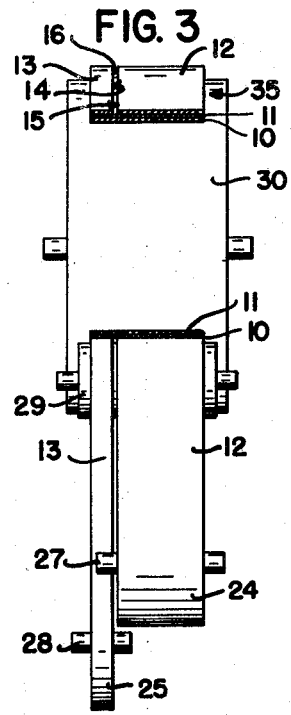
Fig. 3 is a fragmentary vertical section of portions of the apparatus and of the work, based substantially on the line 3—3 of Fig. 2.

Figures 2 and 3 illustrate a preferred disposition of the rolls 20, 24 and 25 and their respective rollers 26, 27 and 28, but the distance separating the edges of the rolls 24 and 25, which provide the longitudinal edges 14 and 15 of the pick-off printed adhesive metal plate, are exaggerated in Fig. 3.

The plate and tab strips are fed to a support as the periphery of the roller 29 to be movably disposed thereon with the strips in parallelism and a longitudinal edge of each contiguous and in facing relationship, and the carrier, with its pressure sensitive coating facing downwardly, is fed so as to be disposed upon the upper faces of the tab and plate strips upon the laminating roller 29 so that the upper faces of the tab and plate strips simultaneously contact the adhesive.

Thereupon it is preferred that the plurality of paralleling strips, with their upper faces contacting the adhesive upon the carrier, be simultaneously pressured into adhesively bonded connection with the adhesive so that, when the carrier is separated from the plate, such as by peeling, the adhesive will come away with the plate. This may be accomplished by the pressure roller 30 mounted to movably bear upon the upper (or non-adhesive coated) face of the carrier while the latter is upon the roller 29 with the tab strip and metallic plate strip being of substantially the same thickness and, preferably the tab strip being of the same metal as that of the metallic plate strip, and the periphery of the pressure roller 30 being smooth and substantially the same distance from the axis of rotation thereof. Pressure is evenly applied so that the degree of adhesive bonding is the same over all adhesive-contacting surfaces of the tab and metallic plate strips and neither will accidently separate. This provides an ideal plate A. Of course, care is taken to apply pressure so that the pressure sensitive adhesive will not squeeze outwardly of the edges of the plate A.

From the roller 29, the laminated strip 35 (being the plate and tab strips, with the adhesive coating between the plate and tab and the carrier) may be carried, by rotation of the roller 30, to suitable tab and/or plate printing means, such as the printing apparatus 31 and 32 shown schematically in Fig. 2 with their printing cylinders 33 and 34 respectively adapted to contact the tab and/or plate strips by, for example, conventional rubber printing plates (not shown) mounted upon the cylinders, with the periphery of the pressure roller 30 providing a platen.

After printing, the laminated strip 35 may be rolled upon a suitable roller 36 after passing over the guide roller 37 for merchandising with subsequent cutting apart of the individual pick-off printed adhesive metal plates A or the laminated strip 35 may pass between the conventional holding rollers 38 and 39 and thence to means to separate the strip 35 into a plurality of the plates A, such as a cutting roller 40 provided with longitudinally extending knives for cutting the laminated strip, whereupon the finished plates A may be discharged into the receptacle 41. When not in use, the roller 40 may be conventionally moved out of the way and its rotation stopped.

Figure 4:
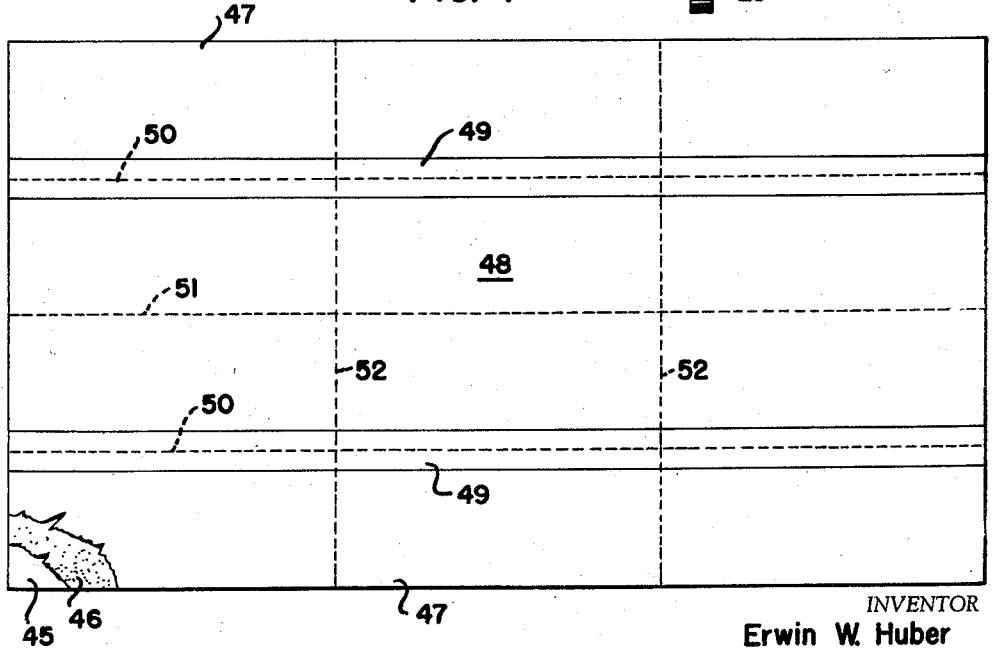
Fig. 4 is a plan of a portion of work which may be employed and processed in a modification of the method of Figs. 2 and 3.

The method may be carried out by employing a wider carrier than that suggested heretofore. Such a carrier 45 may be like the carrier 10 (impregnated, if of paper, as heretofore described) but in sheet form and of a width equal to the width of a plurality of associated tabs and plates to form a plurality of side-by-side plates A as may be appreciated in Fig. 4. Thus a carrier is provided in sheet form to be subsequently cut into twelve pieces. The carrier 45 carries a pressure sensitive adhesive 46 which may be like the adhesive 11, the plate strips may be single width plate strips 47 and double-width plate strips 48 and the tab strips may be double width tab strips 49 arranged as shown. When laminated as described, the work may be printed on a flat-bed press (not shown) as is well known in the printing art and the laminated sheet may be marketed as such to be cut up along the dash longitudinal lines 50 and 51 and transverse lines 52, or the laminated sheet may be cut up as described into plates and the plates A marketed.

In the several methods, it will be noted that the longitudinal edge 15 of the plate 12 whether formed by one or the other method is cut before the steps herein disclosed are carried out. That is, this edge is not formed during any step of laminating and, consequently, the objectionable deformed metal edge referred to in the early part of this disclosure is not a part of the pick-off printed adhesive metal plates of this disclosure as provided by the methods disclosed.

In peeling the carrier 10 or 45 from the adhesive 11 or 46 as the case may be, the operator may grasp the tab 13 and adjacent portion of the carrier 10 and pulling away from the plate, which may be held by the thumb and index finger of the other hand upon the edges normal to the edge 15, the carrier 10 may be peeled readily from the plate 11, all without the portion of the carrier next to the tab tearing away while the carrier is being peeled from the adhesive and plate.

I claim:

1. In the method of producing pick-off adhesive metal plates, those steps which consist in providing a pressure sensitive adhesive-coated flexible carrier, contacting the pressure sensitive adhesive coating thereon with a plurality of substantially parallel strips, one strip being a metallic plate strip and the next adjacent strip being a tab strip, with adjacent edges of said metallic plate strip and tab strip being in contiguous facing relationship, and pressuring said plurality of substantially parallel strips into adhesively bonded connection with said pressure sensitive adhesive coating.

2. In the method of producing pick-off adhesive metal plates, those steps which consist in providing a pressure sensitive adhesive-coated flexible carrier, contacting the pressure sensitive adhesive coating thereon simultaneously with a plurality of substantially parallel strips, one strip being a metallic plate strip and the next adjacent strip being a tab strip, with adjacent edges of said metallic plate strip and tab strip being in contiguous facing relationship, and simultaneously pressuring said plurality of substantially parallel strips into adhesively bonded connection with said pressure sensitive adhesive coating.

3. In the method of producing pick-off adhesive metal plates, those steps which consist in providing a metallic plate strip, a tab strip, and a pressure sensitive adhesive-coated flexible carrier, the pressure sensitive coating thereon having greater adhesive affinity for said metallic plate strip than for said carrier, contacting said pressure sensitive adhesive coating with said strips, with adjacent edges of said strips being in contiguous facing relationship, and pressuring said plurality of substantially parallel strips into adhesively bonded connection with said pressure sensitive adhesive coating.

4. In the method of producing pick-off adhesive metal plates, those steps which consist in providing a flexible carrier, completely covering a face of the carrier with a pressure sensitive adhesive, contacting the pressure sensitive adhesive thereon with a plurality of substantially parallel strips, one strip being a metallic plate strip and the next adjacent strip being a tab strip, with adjacent edges of said metallic plate strip and tab strip being in contiguous facing relationship, and pressuring said plurality of substantially parallel strips into adhesively bonded connection with said pressure sensitive adhesive.

5. In the method of producing pick-off adhesive metal plates, those steps which consist in providing a flexible carrier, coating a face of said carrier with a solution of a pressure sensitive adhesive, driving off a volume of the solvent of said solution upon said carrier, contacting the pressure sensitive adhesive thereon with a plurality of substantially parallel strips, one strip being a metallic plate strip and the next adjacent strip being a tab strip, with adjacent edges of said metallic plate strip and tab strip being in contiguous facing relationship, and pressuring said plurality of substantially parallel strips into adhesively bonded connection with said pressure sensitive adhesive.

6. In the method of producing pick-off adhesive metal plates, those steps which consist in providing a pressure sensitive adhesive-coated flexible carrier, contacting the pressure sensitive adhesive coating thereon with a plurality of substantially parallel strips, one strip being a metallic plate strip and the next adjacent strip being a tab strip, with adjacent edges of said metallic plate strip and tab strip being in contiguous facing relationship, pressuring said plurality of substantially parallel strips into adhesively bonded connection with said pressure sensitive adhesive coating, and subdividing said carrier, with said adhesive coating thereon, and said plate strip and said tab strip bonded thereto, into a plurality of individual pick-off adhesive metal plates.

7. In the method of producing pick-off adhesive metal plates, those steps which consist in providing a pressure sensitive adhesive-coated sheet having substantially parallel opposite edges contacting the pressure sensitive adhesive coating thereon with a plurality of substantially parallel strips, one strip being a tab strip of double width and two strips being metallic plate strips, with one metallic plate strip disposed along one longitudinal edge of said double width tab strip and the other metallic plate strip disposed along the other longitudinal edge of said double-width tab strip, pressuring said plurality of substantially parallel strips into adhesively bonded connection with said pressure sensitive adhesive coating, and subdividing said double-width tab strip longitudinally into two substantially equal parts to provide two substantially alike laminated strips.

8. In the method of producing pick-off adhesive metal plates, those steps which consist in providing a pressure sensitive adhesive-coated sheet having substantially parallel opposite edges, contacting the pressure sensitive adhesive coating thereon with a plurality of substantially parallel strips, one strip being a tab strip of double width and two strips being metallic plate strips, with one metallic plate strip disposed along one longitudinal edge of said double width tab strip and the other metallic plate strip disposed along the other longitudinal edge of said double-width tab strip, pressuring said plurality of substantially parallel strips into adhesively bonded connection with said pressure sensitive adhesive coating, subdividing said double-width tab strip longitudinally into two substantially equal parts to provide two substantially alike laminated strips and subdividing said substantially alike laminated strips into a plurality of substantially alike pick-off adhesive metal plates.

9. In the method of producing pick-off printed adhesive metal plates, those steps which consist in providing a pressure sensitive adhesive-coated flexible carrier, contacting the pressure sensitive adhesive coating thereon with a plurality of substantially parallel strips, one strip being a metallic plate strip and the next adjacent strip being a tab strip, with adjacent edges of said metallic plate strip and tab strip being in contiguous facing relationship, pressuring said plurality of substantially parallel strips into adhesively bonded connection with said pressure sensitive adhesive coating, and printing upon the exposed face of said metallic plate strip while in adhesively bonded connection with said pressure sensitive adhesive coating.

10. In the method of producing pick-off printed adhesive metal plates, those steps which consist in providing a pressure sensitive adhesive-coated flexible carrier, contacting the pressure sensitive adhesive coating thereon with a plurality of substantially parallel strips, one strip being a metallic plate strip and the next adjacent strip being a tab strip, with adjacent edges of said metallic plate strip and tab strip being in contiguous facing relationship, pressuring said plurality of substantially parallel strips into adhesively bonded connection with said pressure sensitive adhesive coating, printing upon the exposed face of said metallic plate strip while in adhesively bonded connection with said pressure sensitive adhesive coating, and subdividing the printed metallic plate strip, said tab strip and said pressure sensitive adhesive-coated flexible carrier into a plurality of pick-off printed adhesive metal plates.

11. In the method of producing pick-off adhesive metal plates, those steps which consist in providing a pressure sensitive adhesive-coated elongated flexible carrier, progressively moving said carrier longitudinally and simultaneously progressively contacting the pressure sensitive adhesive coating thereon by a plurality of longitudinally-moving substantially parallel elongated strips, one strip being a metallic plate strip and the next adjacent strip being a tab strip with adjacent edges thereof being disposed in contiguous facing relationship.

12. In the method of producing pick-off adhesive metal plates, those steps which consist in providing an elongated metallic plate strip, an elongated tab strip, and a pressure sensitive adhesive-coated elongated flexible carrier, the pressure sensitive coating thereon having greater adhesive affinity for said metallic plate strip than for said carrier, contacting said pressure sensitive adhesive coating with said strips, with adjacent edges of said strips being in contiguous facing relationship, and pressuring said plurality of substantially parallel strips into adhesively bonded connection with said pressure sensitive adhesive coating.

References Cited in the file of this patent
UNITED STATES PATENTS

| | | |
|---|---|---|
| 1,583,022 | Stanley et al. | May 4, 1926 |
| 2,139,377 | Mull et al. | Dec. 6, 1933 |
| 2,247,252 | Price | June 24, 1941 |
| 2,372,994 | Welch | Apr. 3, 1945 |
| 2,596,179 | Seymour | May 13, 1952 |
| 2,699,618 | Stupell | Jan. 18, 1955 |
| 2,767,495 | Harris | Oct. 23, 1956 |
| 2,797,801 | Bishop | July 2, 1957 |